United States Patent Office 3,455,863
Patented July 15, 1969

3,455,863
EXTRUSION OF THERMOPLASTIC POLYMERS CONTAINING LUBRICANT AND CARBON BLACK
George E. Williams, Bartlesville, Okla., assignor to Phillips Petroleum Company, a corporation of Delaware
No Drawing. Filed Dec. 20, 1965, Ser. No. 515,174
Int. Cl. B29f 3/00; C08f 29/02, 45/08
U.S. Cl. 260—33.4     4 Claims

ABSTRACT OF THE DISCLOSURE

A thermoplastic extrudate substantially free of voids and imperfections is formed at satisfactory extrusion rates by incorporating in the thermoplastic polymer specified amounts of carbon black and glycerol.

---

This invention relates to the extrusion of thermoplastic polymers. In one aspect, this invention relates to thermoplastic extrusion compositions. In another aspect, this invention relates to the extrusion of thermoplastic polymers wherein a lubricant is used to assist in the extrusion operation.

Previous methods of extruding a thermoplastic wherein a lubricant such as glycerine is used as an extrusion aid have not been completely successful because of the tendency of the lubricant to volatilize and form voids in the extrudate. Reducing the amount of lubricant in an effort to overcome the formation of these imperfections has not been satisfactory because the extrusion rate is substantially reduced when less lubricant is used.

According to this invention, an extrudate substantially free of voids and imperfections can be formed by reducing the amount of lubricant used without reducing the extrusion rate. The extrudate itself possesses several other desirable properties including superior strength apparently because the zones of weakness created by void spaces have been substantially eliminated. The foregoing advantages are realized in accordance with this inveniton by reducing the amount of lubricant used and by employing carbon black in critical amounts in the thermoplastic to be extruded. When a composition employing this critical amount of carbon black is extruded in a dynamic extrusion apparatus using a long land die of the type disclosed in U.S. application Ser. No. 157,992, filed Dec. 8, 1961, the extrusion rate does not decrease even though less lubricant is used. Although the invention is not to be bound by any theory, the increased amount of carbon black in the thermoplastic composition of this invention apparently serves to produce a more rigid extrudate, thus allowing it to achieve a self-supporting state more rapidly. This unexpected result produces higher extrusion rates with less lubricant.

Accordingly, it is an object of this invention to increase the extrusion rate of a thermoplastic polymer.

Another object of this invention is to provide an extrudable composition which can be formed into an extrudate substantially free of voids and imperfections.

The composition of this invention can be used to form extrudates having a variety of different cross sections including solid rods, pipes, channels, and the like. The extrudate of thermoplastic material having an increased strengths.

A further object of this invention is to provide an extrudate of thermoplastic material having an increased strengths.

Still another object of this invention is to provide an improved method of extruding a thermoplastic polymer.

These and other objects of the invention will become apparent to one skilled in the art after studying the following detailed description and the appended claims.

In the practice of this invention, a thermoplastic extrudate substantially free of voids and having an increased strength can be obtained by extruding a composition comprising about 0.3 to about 0.8 weight percent glycerin, about 10 to about 45 weight percent carbon black, and about 54.2 to about 89.7 weight percent thermoplastic polymer. The preferred ranges of the materials in the extrudable composition of this invention are about 0.4 to about 0.8 weight percent glycerin, about 20 to about 35 weight percent carbon black, and about 64.2 to about 79.6 weight percent thermoplastic polymer. A still more preferred range in the composition is about 0.6 to about 0.8 weight percent glycerin, about 22 to about 35 weight percent carbon black, and about 64.2 to about 77.4 weight percent thermoplastic polymer.

The thermoplastic polymers which can be used to form the extrudable composition of this invention can be any homopolymer or copolymer of 1-olefins such as ethylene, propylene, butene, and the like. An ethylene-propylene copolymer is particularly suitable for extrusion with the glycerin and carbon black present in the ranges stated. High molecular weight ethylene polymers are well suited for extrusion by this invention. It is generally preferred that the homopolymer or copolymer have a molecular weight of at least about 100,000.

Although a variety of different types of carbon black can be used to form the composition of this invention, high modulus furnace blacks having an average diameter of 590 A. and a surface area of 40 m.$^2$/g. as determined by nitrogen absorption are particularly suited.

The extrudable composition of this invention can be prepared by dry blending or precompounding the glycerin, carbon black, and thermoplastic polymer in any conventional blending apparatus such as a Banbury-type mixer, Farrel continuous mixer, or the like. It is preferred to employ a diluent for the glycerin such as methyl alcohol, ethyl alcohol, isopropyl alcohol, or tertiary butyl alcohol when the extrudable composition is prepared by dry blending. A diluent is not necessary when the composition is precompounded. Blending conditions such as operating temperatures and rates of feed for the components consistent with techniques well known in the art can be employed for forming the extrudable composition.

trudate thus formed is substantially free of voids and imperfections because of the reduced quantity of lubricant which is used. This result greatly increases the strength of the extrudate because of the absence of weak zones.

The following examples will serve to illustrate the improved and completely unexpected results obtained by the extrudable composition of this invention. These examples are for the purpose of illustration only and must not be considered limiting of the invention.

EXAMPLE 1

High molecular weight ethylene-butene-1 copolymer of 0.94 density, approximately 1.5 high load melt index, was extruded into a one-inch diameter Schedule 40 pipe by means of a dynamic extrusion apparatus having a long land die section. The weight percent glycerin and weight percent carbon black in the copolymer was varied to illustrate the increase in the rate of extrusion. The following table illustrates the improved results obtained with the extrudable compositions within the scope of the invention.

TABLE I

| Glycerin (wt. percent) | Carbon black (wt. percent) | Maximum¹ extrusion rate (in./min.) | High load melt index (ASTM D1238-62T condition F) |
|---|---|---|---|
| 0.4 (control) | 2.5 | 18 | |
| 1.0 (control) | 2.5 | 37 | 0.63 |
| 0.9 (control) | 8 | 38 | .52 |
| 0.8 | 22 | 52 | .15 |
| 0.8 | 22 | 63 | |
| 0.7 | 26 | 38 | .12 |
| 0.7 | 26 | 42 | |
| 0.6 | 35 | 37 | .04 |
| 0.6 | 35 | 33 | |
| 0.5 | 50 | 18 | |

¹ Above this rate a wrinkled surface extrudate is formed.

It is apparent from the data in Table I that the extrusion rate is highest when the percent carbon black in the extrudable composition is maintained between about 15 and about 35 weight percent. Yet, as indicated by the melt index values, which are the usual standard of processability in conventional processing equipment, the effect of the carbon black is to bring about a reduction in flow.

EXAMPLE 2

ASTM D1598-58T test procedure was used to compare and illustrate the superior strength properties of a pipe prepared from the composition of this invention. In these runs, several 21-inch lengths of one-inch Schedule 40 pipe were plugged at one end and immersed in a water bath maintained at 150° F. The other ends of the pipes were separately filled with water and connected to a source of air pressure which would allow different internal pressures to be applied to each pipe. A time meter connected to each pressure line would indicate when a particular pipe had failed. In accordance with this ASTM procedure, the time at which each pipe failed was plotted against the pressure to which it had been subjected to obtain a curve for a given pipe.

The table below compares the hours to failure at a given hoop stress for a standard pipe with the hours to failure at a given hoop stress for a pipe prepared from the composition of this invention. In each case the composition was prepared from an ethyelne-butene-1 copolymer of 0.94 density and a high load melt index of about 1.5. The extrusion for forming each pipe was the same.

| | Hours to failure at 150° F. | |
|---|---|---|
| Hoop stress, p.s.i. | Standard pipe 1% glycerin, 2.5% carbon black | Pipe of this invention, 0.8% glycerin, 22.3% carbon black |
| 1,000 | 300 | >1,000 |
| 1,100 | 6 | >1,000 |
| 1,200 | 1 | >1,000 |
| 1,300 | <1 | 200 |
| 1,400 | <1 | 13 |
| 1,500 | <1 | 7 |
| 1,600 | <1 | 2 |

As can be seen from a comparison of the data at a hoop stress of 1200 p.s.i., the pipe prepared in accordance with this invention exhibits over 1000 times longer service life than the standard pipe.

Although the invention has been described in considerable detail, it must be understood that such detail is for this purpose only and that many variations and modifications can me made by one skilled in the art without departing from the spirit and scope of the invention.

I claim:
1. A method of providing a thermoplastic extrudate substantially free of voids and having increased strength comprising extruding a composition comprising about 0.6 to about 0.8 weight percent glycerine, about 22 to about 35 percent weight percent carbon black and about 64.2 to about 77.4 weight percent ethylene-butene-1 copolymer by forcing a plastic melt of said composition through a long land extrusion zone by the application of pressure impulses.

2. A method according to claim 1 wherein said glycerine is about 0.8 weight percent of said composition, said carbon is about 22 weight percent of said composition, and said ethylene-butane-1 copolymer is about 77.2 weight percent of said composition.

3. A method according to claim 1 wherein said glycerin is about 0.7 weight percent of said composition, said carbon black is about 26 weight percent of said composition, and said ethylene-butene-1 copolymer is about 73.3 weight percent of said composition.

4. A method according to claim 1 wherein said glycerin is about 0.6 weight percent of said composition, said carbon black is about 35 weight percent of said composition, and said ethylene-butene-1 copolymer is about 64.4

References Cited
UNITED STATES PATENTS

| 1,963,896 | 6/1934 | Gardner | 106—307 |
| 2,316,418 | 4/1943 | Habgood | 260—41 |
| 3,076,776 | 2/1963 | Findlay | 260—33.4 |
| 3,206,419 | 9/1965 | Prtichard et al. | 260—23 |
| 3,387,073 | 6/1968 | Larsen | 264—211 |

MORRIS LIEBMAN, Primary Examiner

J. D. DERRINGTON, Assistant Examiner

U.S. Cl. X.R.

260—41; 264—211, 300